United States Patent [19]

Wallis

[11] 4,027,485

[45] * June 7, 1977

[54] MODULAR ENGINE ASSEMBLY

[76] Inventor: Marvin E. Wallis, 5535 Longfellow Road, Santa Barbara, Calif. 93111

[ * ] Notice: The portion of the term of this patent subsequent to Apr. 13, 1993, has been disclaimed.

[22] Filed: Jan. 26, 1976

[21] Appl. No.: 652,326

Related U.S. Application Data

[63] Continuation-in-part of Ser. No. 557,746, March 12, 1975, Pat. No. 3,949,556.

[52] U.S. Cl. .................................. 60/709; 60/718; 74/572
[51] Int. Cl.² ......................................... F01B 21/00
[58] Field of Search ............ 60/698, 706, 709, 711, 60/716, 718; 74/572, 751; 180/54 R, 54 C

[56] References Cited

UNITED STATES PATENTS 3,949,556  4/1976  Wallis .................................. 60/718

Primary Examiner—Allen M. Ostrager
Attorney, Agent, or Firm—Finnegan, Henderson, Farabow & Garrett

[57] ABSTRACT

Disclosed is a modular engine assembly incorporating a primary engine, an auxiliary engine and a device for storing kinetic energy. The kinetic energy storage device is drivingly coupled to the primary engine. In response to demand for additional power, the auxiliary engine is selectively engaged with the energy storage device by a clutch. The auxiliary engine is thereby turned over and brought up to speed. As the auxiliary engine is brought up to speed, its ignition is turned on and fuel is supplied in sequence whereby the auxiliary engine starts or fires only after it is turning over at a high RPM. Once started, the auxiliary engine drives the transmission through the clutch and primary engine thus increasing available power upon demand.

46 Claims, 8 Drawing Figures

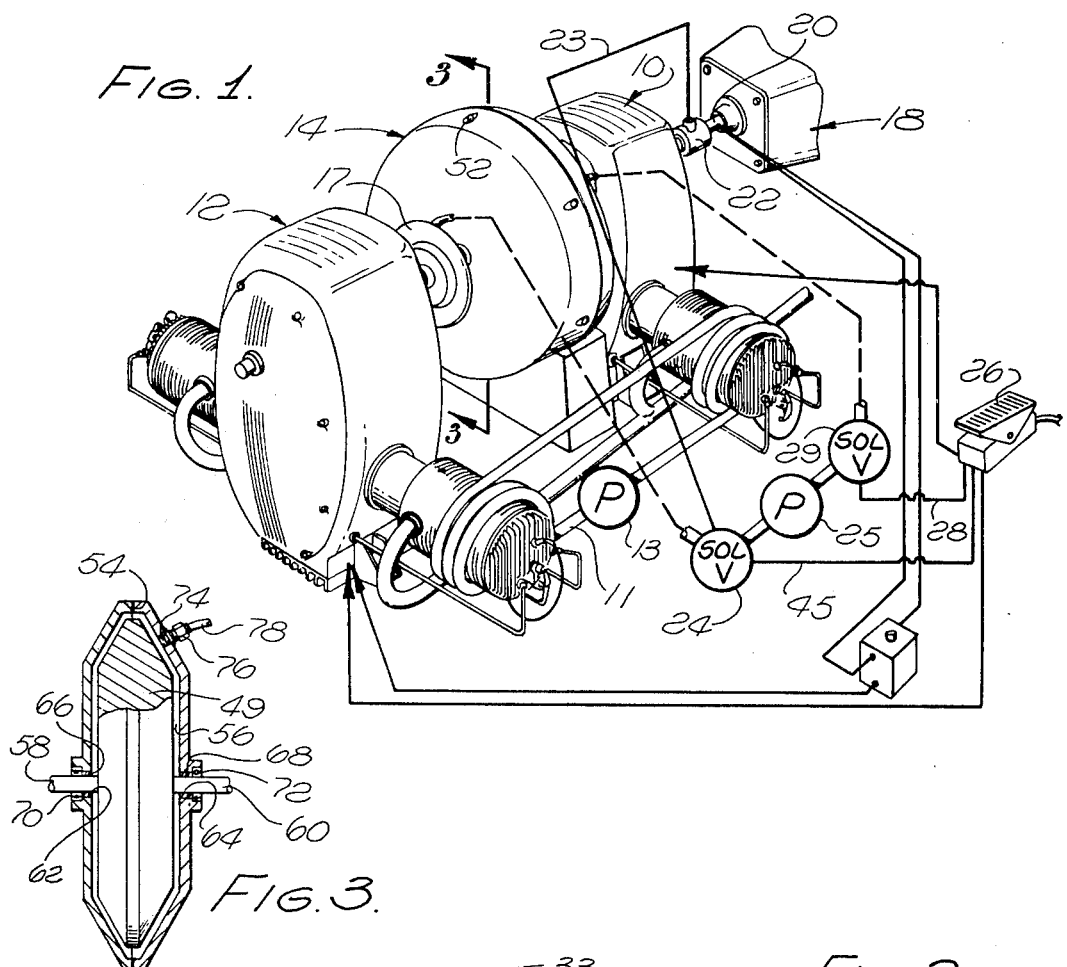
Fig. 1.
Fig. 3.
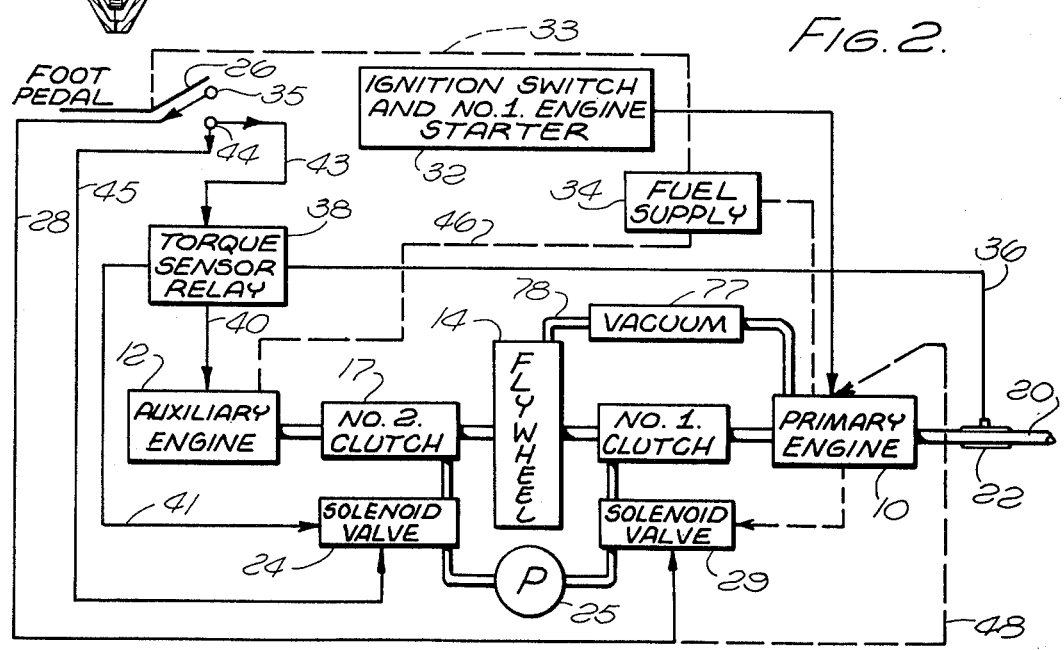
Fig. 2.

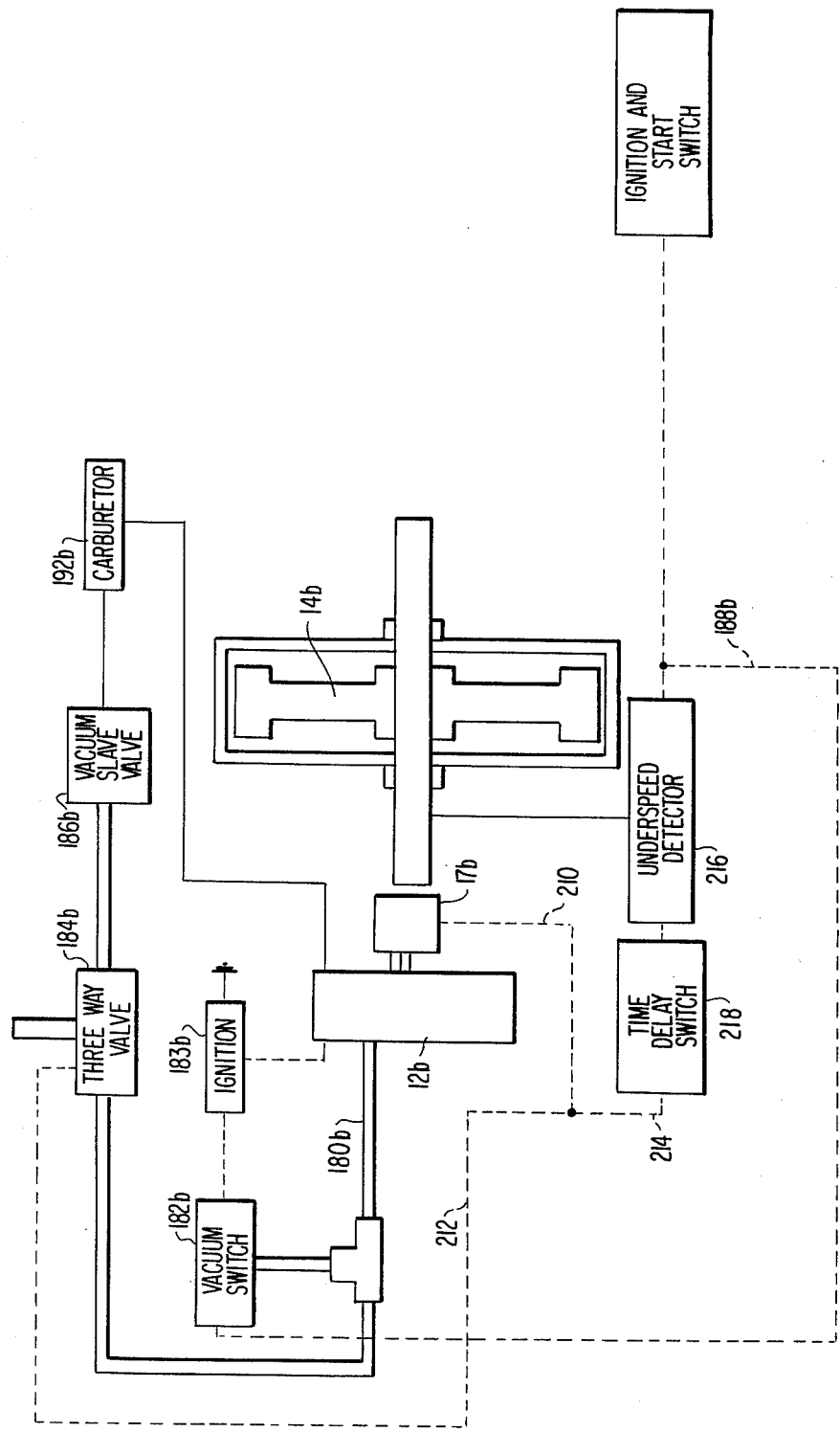

MODULAR ENGINE ASSEMBLY

This application is a continuation-in-part of prior Application Ser. No. 557,746 filed Mar. 12, 1975 for MODULAR ENGINE ASSEMBLY now U.S. Pat No. 3,949,556.

FIELD OF THE INVENTION

The fields of art to which the invention pertains include the fields of internal combustion engines, modular engines of piston, rotary and other types and energy storage devices including flywheels.

BACKGROUND OF THE SUMMARY OF THE INVENTION

Conventional internal combustion engines operate on all cylinders regardless of power requirements, relying upon transmission shifts and/or fuel supply to vary the torque provided in accordance with demand. During most normal driving cycles only a portion of available engine power is utilized, but the entire engine is used for that portion of power. The result is inherent inefficiency of operation, wasted energy, excessive fuel consumption and excessive pollutant emissions.

The present invention overcomes many of the disadvantages of the usual internal combustion engines. In accordance with one form of the present invention, a modular engine assembly is provided which incorporates a "floating" flywheel and a plurality of engines which selectively engage the flywheel via automatic clutches. Initially, the vehicle transmission is driven by a single, primary engine which also drives the flywheel. As additional power is required, as indicated by a torque sensor, or as demanded by an overriding foot pedal position, an auxiliary engine (one or more) is initially started by clutch coupling to the flywheel and thereafter aids the primary engine in driving the transmission.

Modular design enables the practical use of inexpensive, efficient, low polluting, small bore internal combustion engines (e.g. 10–90 cubic inches displacement). Synchronization of spark firing of the primary and auxiliary engines is readily accomplished by a commercially available mini-computer device. While the primary engine includes a starter and manual or automatic choke, the auxiliary engine is supplied, in one form hereof, with a fixed, idealized air/fuel ratio, such as stoichiometric or leaner. Heat transferred from the primary engine to the auxiliary engine maintains the auxiliary engine in a "ready" condition. A sealed housing is provided around the flywheel and vacuum therein is established by connection to the intake manifold of the primary engine. Additionally, the primary engine drives the alternator, air conditioner, and/or other pumps and the like, in the usual manner. Preferably, a hydrostatic transmission is utilized which provides smooth, full-range control of speed and torque. Fluid slip clutches, such as silicon fluid clutches, are preferred so as to provide full floating operation of the flywheel during braking and idling conditions.

The present modular-floating flywheel construction of one form of the present invention permits even the primary engine to stop, rather than be operating, during a temporary pause in vehicle travel, since the flywheel will act to start the primary engine as well as the auxiliary engine. The result is a further reduction in fuel consumption and air pollution.

The "floating" flywheel permits a smoothness of operation usually obtained only with rotary power engines, enables the storage of normally wasted energy and provides for rapid acceleration when required. The effective horsepower of the engine is thus efficiently increased. The primary and auxiliary engines can be identical or can be different, and engines as small as 20 horsepower can be used in conjunction with a larger (50–75 horsepower) engine to effectively drive a full sized automobile. Each engine is complete within itself, having the standard balancing flywheel, common to reciprocating piston engines. Pollutant emissions are low as a result of the extremely low fuel consumption and ability to drive the auxiliary engine with a fixed air/fuel ratio. Accordingly, the present invention provides an advantageous solution to current critical problems of fuel shortage and air pollution.

In another form of the present invention, primary and auxiliary engines of the rotary type are selectively coupled and decoupled one to the other depending upon power requirements during a particular driving condition. The mechanism for coupling and decoupling the engines includes a clutch having a heavy flange and which flange is continuously driven by the primary engine. The flange stores kinetic energy under normal conditions during which additional power beyond that afforded by the primary engine alone is not required. When such additional power is required, the clutch is actuated to couple the auxiliary engine to the rotating flange and the primary engine. The stored kinetic energy is utilized to bring the auxiliary engine up to or turn it over to a predetermined speed.

As the auxiliary engine is brought up to such speed by transfer of the stored kinetic energy from the flange to the auxiliary engine, a vacuum pressure actuated switch turns on the ignition for the auxiliary engine. Subsequently and at a higher vacuum pressure, an electrically actuated control valve shifts to communicate vacuum pressure from the manifold of the auxiliary engine to a vacuum slave valve. The latter vacuum, when subjected to such vacuum pressure, opens the throttle valve in the carburetor of the auxiliary engine. Thus, a fuel-air mixture is provided the auxiliary engine only after it is brought up to speed and its ignition is on. This substantially reduces emissions and provides for a lean burn.

In shutting down the auxiliary engine, the sequence is reversed. That is, the clutch is deenergized and the auxiliary engine is disconnected from the drive train. The control valve also shifts causing the slave valve to close the throttle valve and prevent further delivery of the fuel-air mixture to the auxiliary engine. As the auxiliary engine winds down, the vacuum switch turns off the ignition. By turning the ignition off after delivery of the fuel-air mixture is stopped, emission of unburned fuel is prevented. This vacuum operated system may also be utilized with primary and auxiliary engines of the piston as well as rotary types.

BRIEF DESCRIPTION OF THE DRAWINGS

FIG. 1 is a perspective view, including schematic representations, of a modular engine assembly constructed in accordance with the present invention;

FIG. 2 is a schematic block diagram of the modular engine assembly of the present invention and related components;

FIG. 3 is a cross-sectional view of the flywheel and housing, taken on line 3—3 of FIG. 1, in the direction of the arrows;

FIG. 7 is a schematic block diagram of an underspeed control for the modular engine assembly illustrated in FIG, 1.

DETAILED DESCRIPTION

Figure 4:
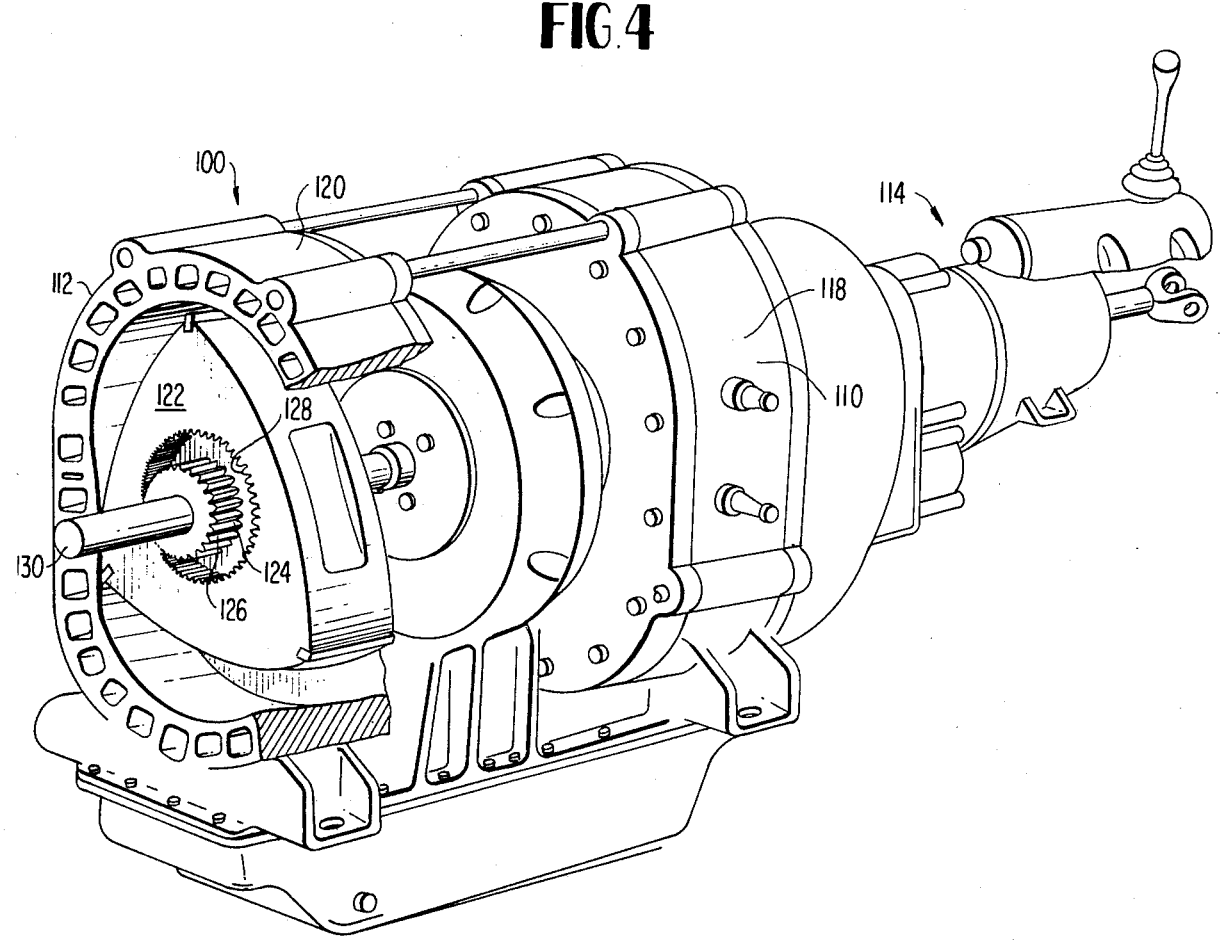
FIG. 4 is a perspective view with parts broken out and in cross section of another form of modular engine assembly constructed in accordance with the present invention.

Referring to FIG. 1, a modular engine assembly is illustrated utilizing a primary engine 10 and an auxiliary engine 12 between which is tandemly mounted a "floating" flywheel 14. The term "floating" is utilized to indicate that the flywheel rotates free of the engine when the engine is braked or the like. This is accomplished by means of automatic slip clutches 16 (FIG. 2) and 17 located one on each side of the flywheel 14 and by means of which the engines 10 and 12 are respectively coupled to the flywheel. The clutches 16 and 17 are preferably fluid-fed slip clutches as will be described in more detail hereinafter. The primary engine is connected to a transmission, shown schematically in FIG. 1, at 18. The transmission is preferably a hydrostatic transmission as will be described in more detail hereinafter, but any commercial transmission can be satisfactorily utilized.

Auxiliary engines are maintained in a "ready" or "go" condition by heat transferred from the primary engine 10 to the auxiliary engine 12. A preferred method for air cooled engines is by wrapping heat conductive tubing "around" the primary engine, that is filled with a liquid such as "DowTherm." A small pump 13 is driven by the primary engine. When water cooled engines are used the cooling medium is pumped through all engine simultaneously. Another method would be to utilize exhaust from the primary engine.

The primary engine 10 is connected to the transmission by means of a drive shaft 20 on which is located a torque sensor 22. As schematically indicated by the line 23, the torque sensor 22 transmits a signal to a solenoid valve 24 which actuates the auxiliary engine clutch by permitting clutch fluid to enter the clutch 17 from a pump therefor, indicated schematically at 25. Operation of the clutch 17 couples the flywheel 14 to the auxiliary engine 12. A standard accelerator foot pedal 26 is electrically connected, as indicated by the line 28, to operate a solenoid valve 29 to similarly actuate the primary engine clutch 16 to couple the primary engine 10 to the flywheel 14. As will be described hereinafter, and as indicated by the line 45, the pedal 26 is also capable of actuating the auxiliary engine clutch 17.

Operation of the assembly can be further illustrated by referring additionally to FIG 2. The primary engine is started by means of an engine starter 32 of conventional construction. As indicated schematically by the line 33, depression of the foot pedal 26 mechanically and variably delivers fuel from a supply 34 thereof to the primary engine 10. Additionally, as the foot pedal 26 is depressed, it immediately makes electrical connection to the solenoid valve 29, indicated 35, to actuate the primary engine clutch, coupling the flywheel 14 to the primary engine 10.

In an alternative embodiment, starting the primary engine 10 results in a signal to the solenoid valve 29 for actuation of the primary engine clutch 16. In this alternative mode, as long as the primary engine 10 is operating, the primary engine clutch 16 is operable.

The auxiliary engine 12 is actuated either automatically or manually. In the automatic mode, a signal is derived from the torque sensor 22 on the primary engine drive shaft 20, which is applied via line 36 to an ignition relay 38 to provide electrical ignition to the auxiliary engine 12 as indicated by the line 40. Additionally, a signal from the torque sensor actuates the solenoid valve 24, via line 41, which in turn actuates the auxiliary engine clutch 17 to couple the flywheel to the auxiliary engine 12. In the manual mode of operation, an electrical switch 44 is closed by depressing the foot pedal 26 to a low point results in actuation of the ignition relay 38 via line 43, and of the auxiliary engine clutch 17 via line 45 and the solenoid valve 24.

As above-mentioned, the foot pedal 26 mechanically delivers fuel from the supply 34 to the primary engine (by carburetion not shown) at a variable rate proportional to depression of the foot pedal. As indicated by the line 46, the auxiliary engine receives fuel from the fuel supply 34, but the fuel is received at a fixed rate (by metering carburetion not shown) which is predetermined for optimum economy and/or pollution reduction. Accordingly, during normal operation of the vehicle containing the modular engine, the foot pedal is depressed to provide variations in speed and/or power, in the usual manner, but when it is desired to accelerate, the foot pedal can be depressed to its bottommost position whereupon the switch 44 is closed, actuating the auxiliary engine clutch 17 and auxiliary engine ignition. The flywheel 14 then serves to start the auxiliary engine 12 which thereby adds power to the primary engine via the clutches 16 and 17.

It will be appreciated that the major components hereinabove referred to are state of art and in most cases, commercially available. As indicated, one can utilize duplicate engines for the primary engine 10 and auxiliary engine 12 or one can use different engines. Preferably, the primary engine 10 is the more powerful of the two or more engines utilized and can conveniently range in horsepower from 20 to 75 horsepower and the auxiliary engine can range in power from 10 to 50 horsepower. With a primary engine of about 65 horsepower, only a single auxiliary engine of about 45 horsepower is needed for the ordinary 5 or 6 passenger vehicle. With such modest horsepower requirements for each engine, one can choose from any number of inexpensive, efficient small engines whether they be rotary, reciprocal, two-stroke, four-stroke, diesel, or otherwise. To exemplify a particular embodiment, one can use a BMW Model R90/6 engine, with 65 horsepower, as the primary engine 10. As the auxiliary engine 12, one can use a BMW Model R/60/6 engine of 45 horsepower. Both engines are two cylinder, four-stroke horizontally opposed engines which are air cooled and constructed of a light alloy material providing low weight. The 65 horsepower engine develops a maximum torque of about 53 ft/lb at 5500 rpm, has a bore of 3.5 inches. a stroke of 2.8 inches and a capacity of 55 cubic inches for a compression ratio of 9:1 The 45 horsepower engine has a maximum torque of about 35 ft/lb at 5000 rpm, a bore of 2.9 inches a stroke of 2.8 inches and a capacity of 36.5 cubic inches for a compression ratio of 9.2:1.

The automatic clutches 16 and 17 are preferably fluid clutches such as the silicon fluid clutch available from the Fluid Power Division of the Eaton Corporation, Marshall, Michigan. Such clutches are composed of facing members which are formed with annular grooves so as to intermesh. Viscous silicon fluid is introduced into the grooves through the solenoid valve 24 or 29 or by means of an automatically operated slide valve. The silicon fluid enters the drive chamber between the mating clutch surfaces and, as a result of viscous shear operation, the drive member drives the follower member. The clutch has no metal to metal contact. Accordingly, without the introduction of the silicon fluid, the unit effectively disengages. When engaged, the unit has a measure of slippage permitting the auxiliary engine 12 to smoothly adjust to power demand. With respect to the primary engine 10, after reaching a given rpm, such as 500-2000 rpm, the primary engine clutch 16 engages the flywheel bringing it up to the same rpm as the engine (which generally operates at about 2000-8000 rpm during ordinary vehicle travel). Alternatively, if required for any particular engine utilization, the clutch can be designed so that the primary engine engages the floating flywheel immediately upon start-up.

In the preferred operation, when the brakes are applied the primary engine clutch 16 automatically disengages (as do other clutches if otherwise operative) and the flywheel 14 continues to rotate free of all engines. The primary engine can then be used for braking. When power is again required, energy stored up in the flywheel 15 helps to bring the primary engine to operating speed and to immediately start the auxiliary engine 12 if the torque sensor 22 signals that operation of the auxiliary engine 12 is required.

In an alternative embodiment, control of the primary engine 10 is assigned to the foot pedal 26 so that simultaneous depression of the foot pedal is required for ignition of the primary engine 10. Such alternative control mode is shown by the dashed line 48 in FIG. 2. In this mode, one would start the primary engine 10 by depressing the foot pedal 26 and concurrently turning the ignition switch and starter 32. One would keep the primary engine 10 running sufficiently long to engage the flywheel 14 and stabilize the same at high speed. Thereafter, the primary engine 10 would stop when the foot pedal is in its uppermost position. Accordingly, one can idle with only the flywheel running during normal short pauses. The flywheel then serves to start the primary engine 10 and/or both the primary engine 10 and auxiliary engine 12, when the foot pedal 26 is depressed to actuate the solenoid valve 29 and/or both valves 24 and 29.

Referring to FIG. 3, the flywheel includes a solid member 49 formed of steel and having a weight which can range from 60-150 lbs. Preferably, the solid flywheel member 49 is about 16 inches in diameter, about 3.5 inches in thickness through a 9 inches diameter central portion and tapering to about 1 inch thickness at its edges. The solid flywheel member 49 is enclosed within a housing 50 which is bolted (at 52 in FIG. 1) through flanges about a gasket 54 so as to seal the housing and form a chamber 56 between the inner housing wall and the solid flywheel member 49. The solid flywheel member 49 is centrally formed with front and rear shafts 58 and 60, respectively, which are journaled for rotation through centrally formed housing openings 62 and 64, respectively. Bearing seals 66 and 68 and bearings 70 and 72 are carried by the housing 50 to facilitate sealed rotation of the flywheel shafts 58 and 60. Additionally, an opening 74 is formed in the side of the flywheel housing 50 and a nipple 76 is threaded into the opening 74. Referring additionally to FIG. 2, flexible tubing 78 connects the nipple 76 to the intake manifold of the primary engine 10 to provide a vacuum 77 within the flywheel chamber 56.

The torque sensor 22 can be of any commerical type and is mounted on the drive shaft 20 connecting the primary engine 10 to the transmission 18. A suitable torque sensor 22 is a torsional variable differential transformer type such as that sold by LeBow Associates, Inc., Troy, Mich. This type of sensor measures the torsional wind-up of a shaft. The drive shaft 20 is made of nonmagnetic material and the LeBow torque sensor 22 includes a sleeve of magnetic material which is mounted on the drive shaft 20. The sleeve has slots that partially close on one side and open on the other side as the shaft twists due to torque. The sleeve portion of the shaft rotates in a magnetic field produced by current carried by a stationary coil mounted in the torque sensor housing. The shaft differentially couples this magnetic field to stationary secondary coils also mounted in the housing. The associated circuitry is designed so that when no torque is being transmitted, the net voltage output is zero. As the shaft twists due to torque, magnetic path differentials are indicated as a voltage output directly proportional to the torque but independent of the rotational speed.

The transmission 18 is preferably a hydrostatic drive which makes possible smooth transmission of the engine horsepower to the drive wheels of the vehicle. A particularly useful transmission is one which serves as a hydrostatic transmission, transmitting all power hydraulically during start-up, but which after start-up transmits most of its power mechanically with a small portion supplied hydraulically. Such a transmission is sold by Sunstrand Corporation, Rapid City, Iowa, under the designation DMT. In the hydrostatic mode, power is transmitted by means of a variable displacement pump and a fixed displacement hydraulic motor. Change to mechanical transmission takes place with no power interruption, the power path being split between the mechanical and hydraulic paths. Such dual mode operation assures maximum power at all speeds.

It will be appreciated that the foregoing description generally has been with respect to commercially available components and that modification thereto in accordance with the principles of the present invention can be readily made. For example, the solid flywheel member 49 can be curved to provide aerodynamic surfaces since the vacuum applied to the flywheel chamber 56 is only a partial vacuum. Other types of transmissions could be used and one could use two or three or even more auxiliary engines.

In accordance with a further form of the present invention, there is illustrated in FIG. 4 a modular engine assembly generally designated 100 comprising a primary engine 110 and an auxiliary engine 112 disposed in tandem. A transmission, generally designated 114, is coupled to the drive shaft, not shown, of primary engine 110. Both the primary and auxiliary engines of this form of the invention are rotary engines, preferably the Wankel type. That is, the primary and auxiliary engines include multi-lobed epitrochoidal outer housings 118 and 120, respectively. Each engine has an inner rotor having a plurality of apices equal to one more in number than the number of lobes, only rotor 122 in the auxiliary engine housing 120 being illustrated. Each rotor and corresponding housing form variable volume working chambers.

A conventional Wankel type rotary engine generally has a triangular shaped rotor 122 with three apices and is rotatable in a two lobed epitrochoidal housing. The primary and auxiliary engines hereof may each comprise such conventional Wankel engines.

Figure 5:
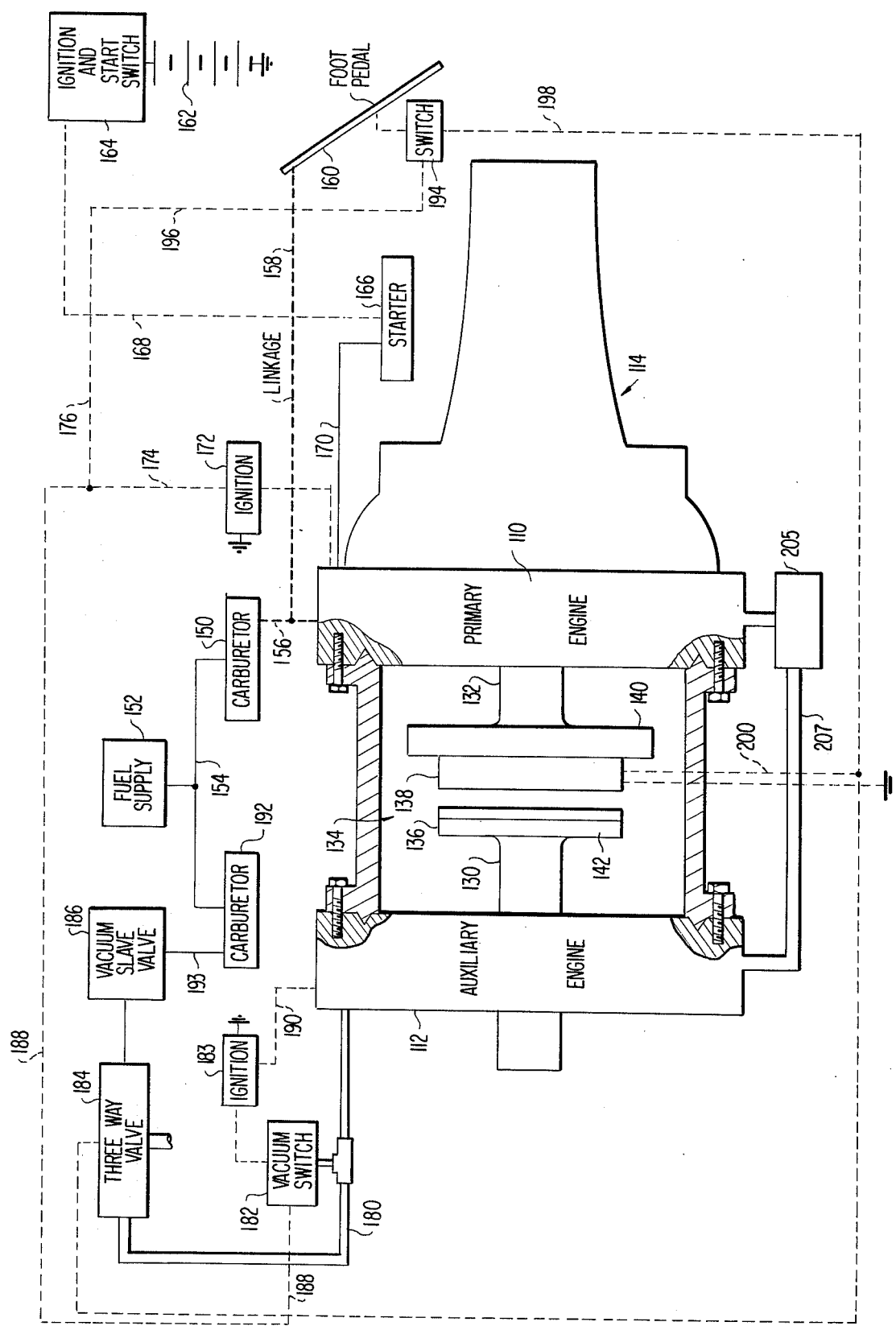
FIG. 5 is a schematic block diagram of the modular engine assembly of FIG. 4 and illustrating the control system thereof.

As illustrated, the auxiliary and primary engines have respective drive shafts 130 and 132 (FIGS. 4 and 5). Each shaft extends through suitable bearings, not shown, in the end walls of its associated housing. Shaft 130 carries a gear 124 within a cavity 126 in rotor 122, the wall of rotor 122 defining cavity 126 being internally geared at 128. The shaft 132 of the primary engine 110 is similarly geared to its rotor. As those familiar with Wankel type engines will appreciate, the cavity in the rotor is eccentric relative to the shaft and gear axis and the rotor transmits its rotary motion about the offset axis of the cavity thereby to rotate the shaft. Further description of these Wankel type rotary engines is not believed necessary since each engine per se is conventional.

It will also be appreciated that, while only one auxiliary engine is illustrated and described, the modular engine assembly of this embodiment may likewise, as in the previous embodiment, comprise a plurality of such auxiliary engines tandemly disposed relative to one another and operable as will be evident from the ensuing description.

The shafts 130 and 132 of the auxiliary and primary engines 112 and 110, respectively, are releasably coupled and decoupled one to the other through a clutch, generally designated 134. Clutch 134 is preferably an electric clutch which may be of the type manufactured by the Warner Electric Brake and Clutch Company, Beloit, Wisconsin, and identified as Model PCC-825. As illustrated schematically in FIG. 5, clutch 134 includes an armature 136 carried by shaft 130 of auxiliary engine 112 and a collector ring 138 carried by shaft 132 of primary engine 110. A heavy flange 140 is carried by shaft 132 directly behind collector ring 138 for purposes to be described. Also, a flange 142 is carried by shaft 130 directly behind armature 136 also for purposes to be described. It will be appreciated that primary shaft 132 and auxiliary engine shaft 130 may be coupled to and decoupled from one another by electrical actuation of clutch 134 and that, when coupled, both the auxiliary engine 112 and primary engine 110 drive transmission 114.

Referring now to FIG. 5, a conventional carburetor 150 supplies fuel from a fuel supply 152 to primary engine 110 via conduits 154 and 156. As conventional, carburetor 150 has a fuel control valve, not shown, which is coupled, by a standard mechanical linkage schematically designated by line 158, to the accelerator or foot pedal 160 of the automobile. There is also illustrated in FIG. 5 a battery 162 which is electrically connected to an ignition and starter switch 164. Switch 164 is connected to a conventional starter 166 as indicated by the dashed line 168. Starter 166 is mechanically connected to the primary engine 110 in conventional manner as schematically illustrated by the full line designated 170. Ignition 172 is electrically coupled to the primary engine 110 as indicated by the dashed lines 174 and 176, line 176 being connected at its opposite end to ignition and start switch 164.

Thus, the primary engine may be operated conventionally. For example, the driver of the vehicle may close switch 164 to turn on the ignition to primary engine 110 and to actuate starter 166. Once the primary engine is started, it is controlled conventionally by depressing and relieving pressure on foot pedal 160. Pedal 160, through linkage 158, operates the throttle valve, not shown, of carburetor 150 whereby primary engine 110 delivers greater or lesser power, dependent upon demand, to transmission 114.

Connected to the intake manifold of auxiliary engine 112 is a conduit 180. Serially connected in conduit 180 is an electric vacuum actuated switch 182, a three-way solenoid actuated vacuum control valve 184, and a vacuum actuated slave valve 186. Vacuum switch 182 is electrically connected to battery 164 as indicated by dashed lines designated 188 and 176. Vacuum switch 182 is also electrically connected, as indicated by the dashed line designated 190, to the ignition 183 for auxiliary engine 112. Vacuum switch 182 comprises a spring loaded diaphragm arrangement which closes a normally open electrical switch in response to sensing a predetermined vacuum. That is, vacuum switch 182 provides an electrical switching function in response to a given vacuum signal from auxiliary engine 112 through conduit 180. Thus, in the present embodiment, electrical switch 182 is normally open and the ignition to auxiliary engine 112 is normally off. Vacuum switch 182 is adapted to close at a predetermined vacuum pressure, for example on the order of 3 inches of mercury, and, when closed, turns on the ignition to auxiliary engine 112. Switch 182 may be of the type manufactured by Borg Warner Corp., Decatur, Ill. and identified as Universal Electric Vacuum Switch.

A carburetor 192 for auxiliary engine 112 is provided and is coupled, preferably through a mechanical linkage schematically illustrated by line 193, to vacuum slave valve 186.

As illustrated in FIG. 5, foot pedal 160 also opens and closes an electrical switch 194 as pedal 160 passes through a predetermined position within its range of movement. Switch 194 is electrically connected to switch 164 and battery 162 as indicated by the dashed line designated 196. Switch 194 is also electrically connected to three-way valve 184 as indicated by the dashed line designated 198. The three-way solenoid actuated vacuum control valve 184 may be of the type manufactured by Borg Warner Corp., Decatur, Illinois and identified as 3-way Solenoid Valve Vacuum Control. Valve 184 normally closes conduit 180 from communication with slave valve 186. Upon actuation of valve 184 in response to closing switch 194, vacuum from the manifold of the auxiliary engine 12 is applied to a pressure sensitive element, not shown, within valve 184. When a predetermined vacuum, for example, 15 inches of mercury, is obtained, valve 184 opens enabling application of vacuum pressure to vacuum slave valve 186.

Vacuum slave valve 186 comprises a conventional valve having a spring loaded diaphragm, not shown, mechanically coupled as indicated by line 193, to carburetor 192. Consequently, the magnitude of vacuum from the intake manifold of auxiliary engine 112 applied to vacuum slave valve 186, once valve 184 enables communication of such vacuum pressure to valve 186, determines the extent to which the valve throttle in carburetor 192 opens. That is, valve 186 controls the throttle valve for carburetor 192 in accordance with the increase or decrease in vacuum pressure of auxiliary engine 112.

As illustrated in FIG. 5, the collector ring of clutch 134 is electrically coupled to line 198 as illustrated by the dashed line designated 200.

The operation of the modular engine assembly described above and illustrated in FIGS. 4 and 5 hereof will now be set forth. As will be recalled, primary engine 110 is started and operated similarly as a conventional automobile engine. In such operation, the large heavy duty flange 140 is also rotated with the primary engine shaft 132. When additional power is desired, foot throttle or pedal 160 is depressed to close switch 194. Closing switch 194 immediately actuates clutch 134 through lines 196, 198 and 200. Actuation of clutch 134 drivingly couples drive shaft 132 of primary engine 110 and the drive shaft 130 of auxiliary engine 112. The heavy duty flange 140 stores sufficient kinetic energy to substantially immediately bring the auxiliary engine 112 up to a predetermined speed without significant loss of power to the primary engine 110. That is, the kinetic energy stored by rotation of the heavy duty flange 140 is utilized to initially rotate shaft 130 and turn over auxiliary engine 112 at a high rate of speed, for example on the order of 700—1000 rpm. It will be appreciated that at this stage of operation the ignition to auxiliary engine 112 is off.

By initially rotating shaft 130 and turning over auxiliary engine 112 at a high rpm, the intake manifold of auxiliary engine 112 is immediately subjected to a vacuum pressure and which pressure is transmitted through conduit 180 to vacuum switch 182. Switch 182 thus senses the vacuum pressure in the auxiliary engine manifold. When a predetermined magnitude of such vacuum pressure is sensed, for example on the order of about 2—3 inches of mercury, switch 182 closes to turn on the ignition to auxiliary engine 112. At this state of operation, however, carburetor 192 remains closed and auxiliary engine 112 is thus not firing.

Also, upon closing switch 194, three-way solenoid actuated valve 184 is energized. Upon energization, the vacuum pressure sensitive element of valve 184 is placed in communication with the intake manifold of auxiliary engine 112 via conduit 180. When the vacuum pressure increases in the auxiliary engine manifold to a predetermined magnitude, i.e. on the order of 15 inches of mercury, the pressure sensitive element of valve 184 shifts valve 184 to communicate the vacuum pressure from the intake manifold of auxiliary engine 112 to vacuum slave valve 186. As will be recalled, valve 186 is coupled by linkage 193 to carburetor 192. Thus, in response to the vacuum pressure communicated to it from the intake manifold of auxiliary engine 112, valve 186 causes the throttle valve in carburetor 192 to open and thereby provide a gas-air mixture to the auxiliary engine. When the gas-air mixture is supplied to auxiliary engine 112 and the ignition is on by means of the previously actuated vacuum switch 182, auxiliary engine 112 fires and drives shaft 130. Consequently, auxiliary engine 112 substantially immediately assists the primary engine through the clutch coupling between the auxiliary and primary engines to drive transmission 114. Valve 186 also controls the throttle valve on carburetor 192 to vary the ratio of the gas-air mixture admitted to auxiliary engine 112 in accordance with the vacuum pressure of the auxiliary engine manifold as sensed by the slave valve 186.

It will be appreciated that the auxiliary engine does not have a starter motor per se. It fires only when it has obtained a predetermined speed and pulls a predetermined vacuum pressure. In this manner, fuel consumption during start-up of the auxiliary engine is sharply curtailed. Undesirable emissions are also sharply reduced.

As in the prior embodiment, the auxiliary engine can be maintained in a warmed ready status. For example, a water pump 205 and conduit 207 may interconnect the cooling systems of the primary engine 110 and the auxiliary engine 112. Consequently, when the auxiliary engine is turned on, it approximates its operating temperature and does not require a warm-up period. Also, a common oil pump and sump for both engines could be utilized.

When the additional power provided by the auxiliary engine is no longer needed, foot pedal 160 is relieved and switch 194 opens. Opening switch 195 deenergizes clutch 134 and shafts 130 and 132 are thus immediately decoupled one from the other. The three-way solenoid actuated valve 184 is also deenergized and shifts to vent conduit 180 to atmosphere. When shifted, valve 184 also closes off communication between vacuum slave valve 186 and the intake manifold of auxiliary engine 112. Valve 186 thus spring returns and closes the control throttle on carburetor 192 precluding further admission of the fuel-air mixture into auxiliary engine 112. As the vacuum increases to atmosphere in the auxiliary engine manifold, vacuum switch 182 opens and turns off the ignition to auxiliary engine 112. By turning the ignition off subsequent to closing the throttle valve in carburetor 192, complete burning of the fule remaining in the auxiliary engine is ensured. Thus, emission of unburned fuel is prevented.

Figure 6:
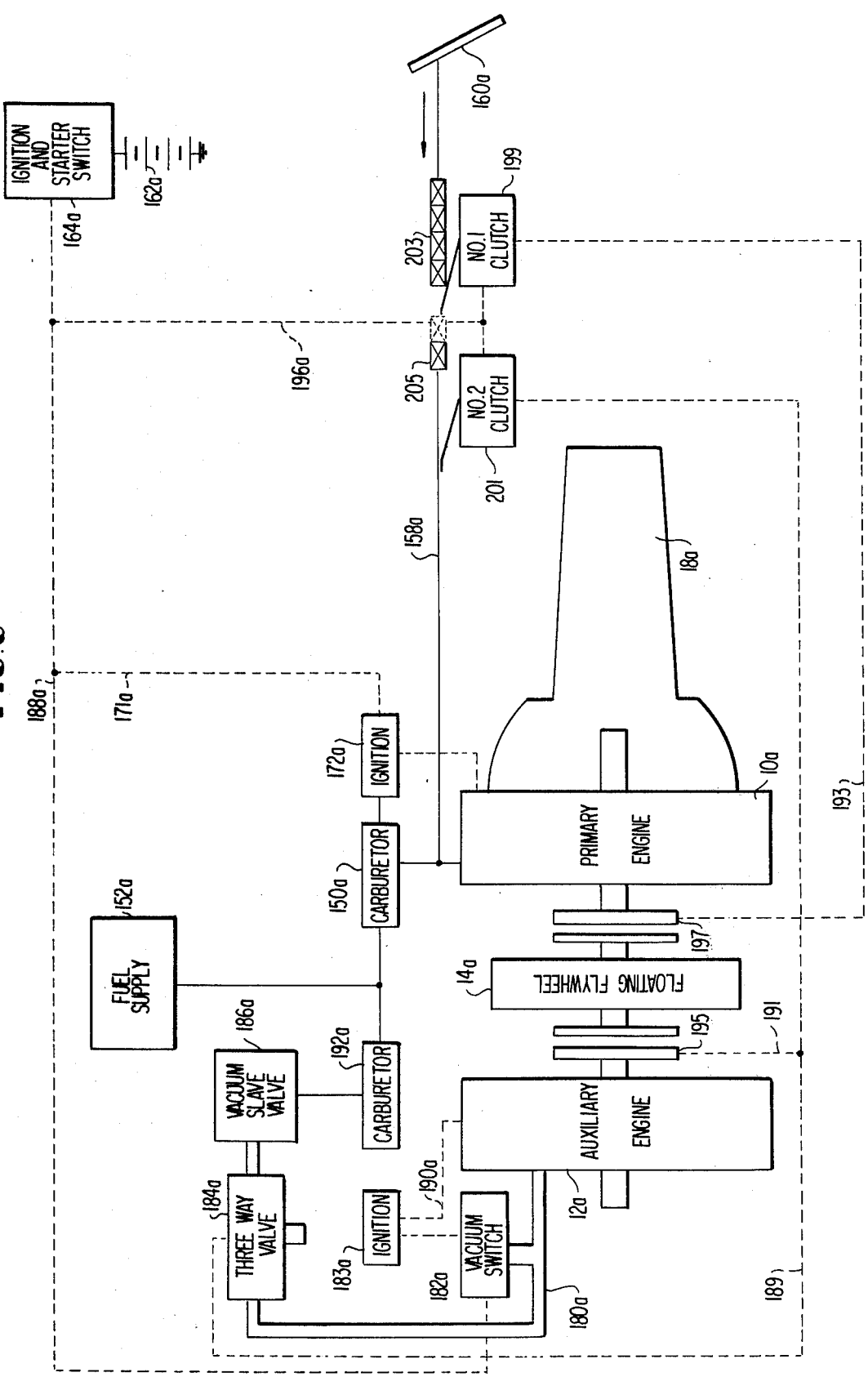
FIG. 6 is a view similar to FIG. 5 illustrating a similar control system applied to the modular engine assembly illustrated in FIG. 1.

It will be appreciated that the auxiliary engine control system including the start-up, vacuum carburetor control and shut-down described above with respect to FIGS. 4 and 5 is also useful in non-rotary type engines, such as those illustrated in the embodiment hereof of FIGS. 1–3. Also, such control system may be utilized in a modular engine assembly having a flywheel interconnecting the primary and auxiliary engines and the engines of such assembly may be rotary, piston or other types as desirable, For example, such similar control system is illustrated in FIG. 6 in conjunction with the modular engine assembly illustrated in FIGS. 1–3. Like parts as described and illustrated in the prior modular engine assembly of FIGS. 1–3 and the control system of the modular engine assembly of FIGS. 4–5 are designated in FIG. 6 with like reference numerals followed by the suffix a. In this form, electric clutches 195 and 197 are coupled between the flywheel 14a and the respective primary and auxiliary engines to selectively couple and decouple the engines relative to the flywheel 14a. Normally open switches 199 and 201 electrically connect clutches 195 and 197 with battery 162a through the starter switch 164a, line 196a and lines 193 and 191 respectively. Thus, in FIG. 6, the primary engine 10a is operated in the conventional manner. Depression of foot pedal 160a also closes clutch switch 199 by means of a mechanical switch actuating element 203 on carburetor linkage 158a. Closing switch 199 energizes clutch 195 and drivingly couples flywheel 14a to primary engine 10a.

When additional power is needed, the pedal 160a is further depressed and a mechanical switch actuating element 205 on carburetor linkage 158a closes clutch switch 201. Closing switch 201 energizes clutch 197 to couple the flywheel to the auxiliary engine whereby the kinetic energy of the flywheel is utilized to bring the auxiliary engine up to a predetermined speed. When a predetermined magnitude of vacuum pressure is sensed, i.e. 2 or 3 inches of mercury, switch 182a turns on the ignition to auxiliary engine 12a. At a greater magnitude of of vacuum pressure as sensed by valve 184a, valve 184a shifts to place vacuum slave valve 186a in communication with the auxiliary engine's intake manifold via conduit 180a. Valve 186a thus opens the throttle valve of carburetor 192a and enables auxiliary engine 12a to fire and drive transmission 18a through the flywheel 14a. Valve 186a also controls the ratio of the fuel-air mixture in response to changes in vacuum pressure in the auxiliary engine's manifold.

Auxiliary engine shut-down is accomplished similarly as previously described. When additional power is no longer needed, foot pedal 160a is relieved and element 205 enables clutch switch 201 to open. Opening clutch switch 201 deenergizes clutch 197 thereby decoupling the auxiliary engine from the flywheel and drive train. Opening switch 201 also enables valve 184a to shift which, in turn, enables valve 186a to close the throttle valve in carburetor 192a. Subsequently, as the manifold pressure approaches atmospheric pressure, switch 182a opens to turn off the ignition to auxiliary engine 12a.

Referring now to FIG. 7, there is illustrated a further improved form of the invention hereof illustrated in FIGS. 1–3. Particularly, it will be recalled that the flywheel of the embodiment hereof illustrated in FIGS. 1–3 may be declutched or decoupled from both the primary and auxiliary engines, for example when stopping at a stop light. Under such conditions, it is possible that flywheel 14 can slow sufficiently to be incapable of bringing the auxiliary engine up to the predetermined speed desirable before the auxiliary engine is started or fired. The form of the present invention illustrated in FIG. 7 provides for the detection of such condition and for starting the auxiliary engine and clutching it to the flywheel in response thereto. Thus, the flywheel is brought back up to speeds sufficient to subsequently start the one or more auxiliary engines utilized upon further demand for power.

To this end, auxiliary engine 12b illustrated in FIG. 7 is started as previously described with respect to the embodiments hereof illustrated in FIGS. 4–6. That is, vacuum switch 182b, the three-way solenoid actuated valve 184b, vacuum slave valve 186b, and carburetor 192b, are used as previously described to turn on the ignition to auxiliary engine 12b and to supply the fuel-air mixture thereto. Also, clutch 17b interposed between auxiliary engine 12b and primary engine 14b is electrically coupled via lines 210 and 212 to the three-way solenoid actuated valve 184b. Line 188b electrically connects vacuum switch 182b to the power supply. The clutch 17b is also electrically coupled via lines 214 and 210 to an underspeed detector 216 and time delay switch 218 connected in series in line 214. Underspeed detector 216 may be of the type manufactured by Peco Corporation, 450 Landess Avenue, Milpitas, Calif., 95035 and designated Model SM Modular Control C-3177. When a speed below a predetermined speed of flywheel 14b is sensed by underspeed detector 216, it energizes clutch 17b through time delay switch 218b. Simultaneously it energizes the three-way solenoid actuated valve 184b through line 212. The auxiliary engine is thus started similarly as previously described with clutch 17b drivingly coupling the auxiliary engine 12b to flywheel 14b. In this manner, flywheel 14b is brought up to the predetermined speed. Upon expiration of the predetermined time delay of switch 218, switch 218 opens deenergizing clutch 17b and the solenoid of valve 184b. Valve 184b shifts to stop auxiliary engine 12b in the manner previously described with respect to FIGS. 4–6. Decoupling clutch 17b from the auxiliary engine and flywheel enables the flywheel to run freely at or above the desired speed. The time delay switch 218 automatically resets itself. It will be appreciated that the underspeed control described herein is useful with the flywheel particularly when the flywheel is decoupled from both the auxiliary and primary engines.

It will be recalled, with reference to FIG. 2, that the engine 10 may be started and the clutch between the engine 10 and flywheel 14 engaged upon depression of foot pedal 26. Also, engine 10 stops and the clutch disengages when the foot pedal lies in its uppermost position. Thus, as noted previously, engine 10 may be stopped and declutched from the flywheel when, for example, pausing at a traffic signal. When power is required, depression of foot pedal 26 clutches the flywheel to the primary engine whereby the primary engine is immediately brought up to speed by the flywheel and started. This has particular advantage in reducing emissions when idling.

The combination of a device for storing kinetic energy and a single engine selectively coupled and decoupled one to the other through a clutch may be utilized to reduce emissions particularly when idling and without one or more additional engines disposed in tandem therewith. Consequently, the combination of a flywheel, clutch and engine may be utilized in an automobile such that the engine is stopped during short pauses and restarted through actuation of the clutch whereby the kinetic energy stored in the flywheel is immediately applied to the engine and the latter is brought immediately up to speed with consequent reduction in emissions during idling.

Figure 8:
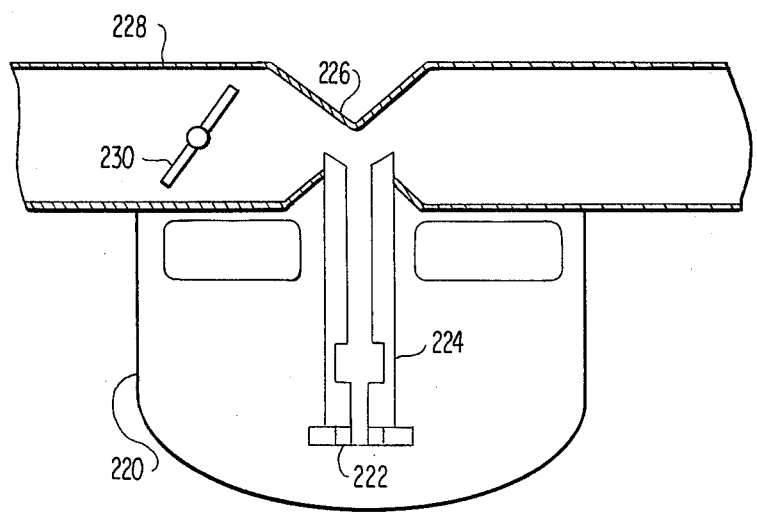
FIG. 8 is an enlarged cross-sectional view of a carburetor for use with the auxiliary engine and control systems therefor illustrated in FIGS. 5 and 6.

Referring now to FIG. 8, there is illustrated a carburetor particularly useful for the auxiliary engine in any one of the various forms hereof. Particularly, FIG. 8 discloses a float control bowl 220 and a main jet 222 disposed in the bowl Jet 222 has an atomizing tube 224 which is open at its upper end to the venturi section 226 of the flow conduit 228 of the auxiliary engine. A throttle control valve 230 is disposed upstream of the venturi section 226 and is under the control of the vacuum slave valve.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A modular engine assembly for connection with a transmission driven thereby comprising:
   a primary rotary engine,
   means for starting said primary rotary engine,
   means for connecting said primary engine to the transmission for driving the latter by said primary engine,
   an auxiliary rotary engine,
   means for selectively coupling and decoupling said auxiliary rotary engine and said primary rotary engine one to the other for driving the transmission selectively by said primary engine or both said primary engine and said auxiliary engine, and
   means for starting said auxiliary engine including means for storing kinetic energy developed by said primary engine and applying said kinetic energy to said auxiliary engine to assist in starting said auxiliary engine.

2. An assembly according to claim 1 wherein said storing and applying means comprises a flywheel.

3. An assembly according to claim 2 wherein said flywheel is tandemly disposed between said primary engine and said auxiliary engine.

4. An assembly according to claim 2 wherein said coupling and decoupling means includes a first clutch for engaging said flywheel and said primary engine and a second clutch for engaging said flywheel and said auxiliary engine, and means for selectively actuating said first clutch to drivingly engage said flywheel and said primary engine and said second clutch to drivingly engage said flywheel and said auxiliary engine.

5. An assembly according to claim 4 wherein said engines, said clutches, and said flywheel each have front and rear sides and in which said primary engine comprises a rotatable shaft having a section connected rearwardly to said transmission and a section connected forwardly to the rear side of said first clutch, said flywheel comprising a rotatable shaft connected rearwardly to the front side of said first clutch and forwardly to the rear side of said second clutch, said auxiliary engine comprising a rotatable shaft connected rearwardly to the front side of said second clutch.

6. An assembly according to claim 4 wherein said first and second clutches are slip clutches.

7. An assembly according to claim 1 including means for transferring heat from said primary engine to said auxiliary engine thereby to maintain said auxiliary engine in a ready condition.

8. An assembly according to claim 1 wherein said storing and applying means comprises a rotating mass carried by said primary engine.

9. An assembly according to claim 8 wherein said coupling and decoupling means includes a clutch disposed between said primary engine and said auxiliary engine.

10. An assembly according to claim 9 wherein said mass is coupled to said primary engine and continuously driven thereby, said clutch being disposed between said mass and said auxiliary engine.

11. An assembly according to claim 1 wherein said auxiliary engine is brought up to a predetermined speed when said kinetic energy is applied thereto, means for supplying fuel to said auxiliary engine, and means coupled to said fuel supply means and said auxiliary engine for initiating flow of fuel to said auxiliary engine when said auxiliary engine obtains said predetermined speed.

12. An assembly according to claim 1 wherein said auxiliary engine is brought up to a specified speed when said kinetic energy is applied thereto, means for sensing said specified speed of said auxiliary engine, said starting means including an ignition, and means responsive to said sensing means, when said auxiliary engine obtains said specified speed, for actuating said ignition thereby to start said auxiliary engine and drive the transmission by both said primary engine and said auxiliary engine when coupled one to the other.

13. An assembly according to claim 12 wherein said auxiliary engine is brought up to a predetermined speed greater than said specified speed when said kinetic energy is applied thereto, means for supplying fuel to said auxiliary engine, and means coupled to said fuel supply means and said auxiliary engine for initiating flow of fuel to said auxiliary engine when said auxiliary engine obtains said predetermined speed.

14. An assembly according to claim 1 including means for sensing the magnitude of the kinetic energy stored by said storing means and providing an output signal in response to sensing a magnitude thereof less than a predetermined magnitude, and means responsive to said output signal for coupling said auxiliary engine and said storing means and starting said auxiliary engine whereby said auxiliary engine increases the magnitude of the kinetic energy stored by said storing means.

15. A modular engine assembly for connection with a transmission driven thereby comprising:
   a primary engine,
   means for starting said primary engine,
   means for connecting said primary engine to the transmission for driving the latter by said primary engine,
   an auxiliary engine,
   means for selectively coupling and decoupling said auxiliary engine and said primary engine one to the other for driving the transmission selectively by said primary engine or both said primary engine and said auxiliary engine,
   means for starting said auxiliary engine including means for storing kinetic energy developed by said primary engine and applying said kinetic energy to said auxiliary engine to bring said auxiliary engine up to a predetermined speed,
   means for supplying fuel to said auxiliary engine, and
   means coupled to said fuel supply means and said auxiliary engine for initiating flow of fuel to said auxiliary engine when said auxiliary engine obtains said predetermined speed.

16. An assembly according to claim 15 wherein said storing and applying means comprises a flywheel.

17. An assembly according to claim 16 wherein said flywheel is tandemly disposed between said primary engine and said auxiliary engine.

18. An assembly according to claim 16 wherein said coupling and decoupling means includes a first clutch for engaging said flywheel and said primary engine and a second clutch for engaging said flywheel and said auxiliary engine, and means for selectively actuating said first clutch to drivingly engage said flywheel and said primary engine and said second clutch to drivingly engage said flywheel and said auxiliary engine.

19. An assembly according to claim 18 wherein said engines, said clutches, and said flywheel each have front and rear sides and in which said primary engine comprises a rotatable shaft having a section connected rearwardly to said transmission and a section connected forwardly to the rear side of said first clutch, said flywheel comprising a rotatable shaft connected rearwardly to the front side of said first clutch and forwardly to the rear side of said second clutch, said auxiliary engine comprising a rotatable shaft connected rearwardly to the front side of said second clutch.

20. An assembly according to claim 15 wherein said storing and applying means comprises a rotating mass carried by said primary engine.

21. An assembly according to claim 20 wherein said coupling and decoupling means includes a clutch disposed between said primary engine and said auxiliary engine.

22. An assembly according to claim 21 wherein said mass is coupled to said primary engine and continuously driven thereby, said clutch being disposed between said mass and said auxiliary engine.

23. An assembly according to claim 15 including means for sensing the magnitude of the kinetic energy stored by said storing means and providing an output signal in response to sensing a magnitude thereof less than a predetermined magnitude, and means responsive to said output signal for coupling said auxiliary engine to said storing means and starting said auxiliary engine whereby said auxiliary engine increases the magnitude of the kinetic energy stored by said storing means.

24. A modular engine assembly for connection to a transmission driven thereby comprising:
a primary engine,
means for starting said primary engine, means for connecting said primary engine to the transmission for driving the latter by said primary engine,
an auxiliary engine,
means for selectively coupling and decoupling said auxiliary engine and said primary engine one to the other for driving the transmission selectively by said primary engine or both said primary engine and said auxiliary engine,
means for starting said auxiliary engine including means for storing kinetic energy developed by said primary engine and applying said kinetic energy to said auxiliary engine to bring said auxiliary engine up to a specified speed,
means for sensing the specified speed of said auxiliary engine,
said starting means including an ignition, and
means responsive to said sensing means for actuating said ignition when said auxiliary engine obtains said specified speed thereby to start said auxiliary engine and drive the transmission from both said primary engine and said auxiliary engine when coupled one to the other.

25. An assembly according to claim 24 wherein said auxiliary engine is brought up to a predetermined speed greater than said specified speed when said kinetic energy is applied thereto, means for supplying fuel to said auxiliary engine, and means coupled to said fuel supply means and said auxiliary engine for initiating flow of fuel to said auxiliary engine when said auxiliary engine obtains said predetermined speed.

26. An assembly according to claim 24 wherein said storing and applying means comprises a flywheel.

27. An assembly according to claim 26 wherein said flywheel is tandemly disposed between said primary engine and said auxiliary engine.

28. An assembly according to claim 26 wherein said coupling and decoupling means includes a first clutch for engaging said flywheel and said primary engine and a second clutch for engaging said flywheel and said auxiliary engine, and means for selectively actuating said first clutch to drivingly engage said flywheel and said primary engine and said second clutch to drivingly engage said flywheel and said auxiliary engine.

29. An assembly according to claim 28 wherein said engines, said clutches, and said flywheel each have front and rear sides and in which said primary engine comprises a rotatable shaft having a section connected rearwardly to said transmission and a section connected forwardly to the rear side of said first clutch, said flywheel comprising a rotatable shaft connected rearwardly to the front side of said first clutch and forwardly to the rear side of said second clutch, said auxiliary engine comprising a rotatable shaft connected rearwardly to the front side of said second clutch.

30. An assembly according to claim 28 wherein said first and second clutches are slip clutches.

31. An assembly according to claim 24 wherein said storing and applying means comprises a rotating mass carried by said primary engine.

32. An assembly according to claim 31 wherein said coupling and decoupling means includes a clutch disposed between said primary engine and said auxiliary engine.

33. An assembly according to claim 32 wherein said mass is coupled to said primary engine and continously driven thereby, said clutch being disposed between said mass and said auxiliary engine.

34. A modular engine assembly according to claim 24 including means for sensing the magnitude of the kinetic energy stored by said storing means and providing an output signal in response to sensing a magnitude thereof less than a predetermined magnitude, and means responsive to said output signal for coupling said auxiliary engine and said storing means and starting said auxiliary engine whereby said auxiliary engine increases the magnitude of the kinetic energy stored by said storing means.

35. A modular engine assembly for connection to a transmission driven thereby comprising:
a primary engine,
means for starting said primary engine,
means for connecting said primary engine to the transmission for driving the latter by said primary engine,
an auxiliary engine,
means for selectively coupling and decoupling said auxiliary engine and said primary engine one to the other for driving the transmission selectively by said primary engine or both said primary engine and said auxiliary engine,
means for starting said auxiliary engine including means for storing kinetic energy developed by said primary engine and applying said kinetic energy to said auxiliary engine to assist in starting said auxiliary engine,
means for sensing the magnitude of the kinetic energy stored by said storing means and providing an output signal in response to sensing a magnitude thereof less than a predetermined magnitude, and
means responsive to said output signal for coupling said auxiliary engine and said storing means and starting said auxiliary engine whereby said auxiliary engine increases the magnitude of the kinetic energy stored by said storing means.

36. An assembly according to claim 34 wherein said storing and applying means comprises a flywheel.

37. An assembly according to claim 36 wherein said flywheel is tandemly disposed between said primary engine and said auxiliary engine.

38. An assembly according to claim 36 wherein said coupling and decoupling means includes a first clutch for engaging said flywheel and said primary engine and a second clutch for engaging said flywheel and said auxiliary engine, and means for selectively actuating said first clutch to drivingly engage said flywheel and said primary engine and said second clutch to drivingly engage said flywheel and said auxiliary engine.

39. An assembly according to claim 38 wherein said engines, said clutches, and said flywheel each have front and rear sides and in which said primary engine comprises a rotatable shaft having a section connected rearwardly to said transmission and a section connected forwardly to the rear side of said first clutch, said flywheel comprising a rotatable shaft connected rearwardly to the front side of said first clutch and forwardly to the rear side of said second clutch, said auxiliary engine comprising a rotatable shaft connected rearwardly to the front side of said second clutch.

40. An assembly according to claim 38 wherein said first and second clutches are slip clutches.

41. An assembly according to claim 34 wherein said storing and applying means comprises a rotating mass carried by said primary engine.

42. An assembly according to claim 41 wherein said coupling and decoupling means includes a clutch disposed between said primary engine and said auxiliary engine.

43. An assembly according to claim 42 wherein said mass is coupled to said primary engine and continuously driven thereby, said clutch being disposed between said mass and said auxiliary engine.

44. An engine assembly for connection with a transmission driven thereby comprising:
an engine,
means for connecting said engine to the transmission for driving the latter by said engine,
means for starting said engine including means for storing kinetic energy developed by said engine when started,
means for selectively coupling and decoupling said engine and said kinetic energy storing means one to the other, and
means for controlling said coupling and decoupling means whereby said engine may be decoupled and stopped during low power requirements and coupled to said storing means to apply kinetic energy stored thereby to said engine and assist in starting said engine.

45. An engine assembly according to claim 44 wherein said kinetic energy storing means comprises a flywheel.

46. An engine assembly according to claim 44 wherein said control means includes a foot pedal movable between two positions, said foot pedal in one position being operable to decouple said engine and said kinetic energy storing means, said foot pedal in the other position being operable to couple said engine and said kinetic energy storing means.

* * * * *